Patented Jan. 19, 1932

1,841,963

UNITED STATES PATENT OFFICE

MAX ALBERT KUNZ, OF MANNHEIM, AND KARL KÖBERLE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

PRODUCTION OF VAT DYESTUFFS

No Drawing. Original application filed June 16, 1927, Serial No. 199,420, and in Germany January 14, 1927. Divided and this application filed July 23, 1928. Serial No. 296,089.

The subject matter of the present application has been divided out from our copending application for the manufacture of vat dyestuffs, Ser. No. 199,420, filed June 16, 1927, and relates to the manufacture of vat dyestuffs which are considered to be halogenated ms-anthradianthrones.

We have found that valuable vat dyestuffs are produced when halogen is introduced into the dyestuffs which are considered to be ms-anthradianthrones corresponding to the general formula:

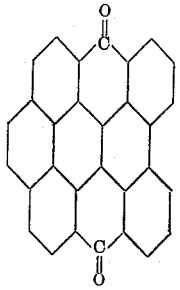

and which may be obtained according to our copending applications Ser. Nos. 296,086, 296,087 and 296,088.

The new dyestuffs are distinguished from the ms-anthradianthrones which are free from halogen by their deeper color, which mostly is substantially more reddish and by their excellent affinity. Moreover, these new products are of great interest not only as vat dyestuffs, but also as intermediate products for the manufacture of other vat dyestuffs.

The introduction of halogen may be effected in various ways. For example, halogen, or agents liberating the same, may be allowed to act on the dyestuffs in the presence or absence of catalysts. Suitable catalysts for this purpose, are for example, iodine, sulfur, metals and metallic salts. The reaction is preferably carried on in solvents or diluents.

The properties of the halogeniferous ms-anthradianthrones can be substantially improved by introducing several different halogens into the ms-anthradianthrones. This is effected by treating the said anthrone derivative with different halogens either concurrently or successively, for example with chlorine and bromine, or suitable agents which liberate halogens, and preferably in the presence of solvents or diluents and in the presence or absence of halogen transferrers. The introduction of different halogens into the ms-anthradianthrones may also be effected by introducing into such halogen-ms-anthradianthrones which are still capable of taking up more halogen, another halogen, which differs from that already contained in the original substance, the said introduction being carried out in the manner already described.

For purification the halogenated ms-anthradianthrones may be recrystallized from solvents of high boiling point, or may be treated, in paste form, with hypochlorite. They give violet solutions in concentrated sulfuric acid and furnish, with an alkaline hydrosulfite solution bluish-violet vats from which orange dyeings are obtained on cotton.

The following examples will further explain the nature of the invention which however is not restricted to these examples. The parts are by weight.

Example 1

10 parts of ms-anthradianthrone are suspended in 200 parts of trichlorbenzene, 0.5 part of iodine being added, and chlorine passed in at 150° C. until the reaction product acquires an orange-red color, which will occur in about an hour. After cooling, the orange-red precipitate is filtered by suction. The resulting dichlor-ms-anthradianthrone dissolves to a violet solution in concentrated sulfuric acid. The vat solution is bluish-violet and the resulting dyeings are orange.

Example 2

10 parts of ms-anthradianthrone are dissolved in 250 to 300 parts of nitrobenzene, and after addition of 0.5 part of iron filings or powder are treated with about 15 parts of bromine, stirred in at 160° C. Stirring is continued for about 4 hours at the same temperature, and the dyestuff is filtered by suction after cooling. According to analysis, it is a dibromine derivative. It gives a violet solution in concentrated sulfuric acid, and a bluish-violet vat which furnishes orange dyeings on cotton.

Example 3

A suspension of 1 part of ms-anthradianthrone in 20 parts of phosphorous oxychloride is boiled for 1½ to 2 hours with 10 parts of phosphorous pentachloride, after which the reaction product is decomposed with water and filtered off by suction. The resulting brown monochlor-ms-anthradianthrone may be purified with hypochlorite; it gives extremely fast orange dyeings on cotton from a bluish-violet vat.

What we claim is:

1. As new articles of manufacture dichlor-ms-anthradianthrones dissolving to a violet solution in concentrated sulfuric acid and forming a bluish-violet vat.
2. The process of producing new vat dyestuffs which comprises subjecting an ms-anthradianthrone to the action of a halogenating agent.
3. The process of producing new vat dyestuffs which comprises subjecting an ms-anthradianthrone to the action of a halogenating agent in a diluting medium.
4. The process of producing new vat dyestuffs which comprises subjecting an ms-anthradianthrone to the action of a halogenating agent in a diluting medium in the presence of a halogen-transferrer.
5. The process of producing dichlor-ms-anthradianthrone which comprises subjecting ms-anthradianthrone suspended in trichlorbenzene to the action of chlorine in the presence of iodine.

In testimony whereof, we affix our signatures.

MAX ALBERT KUNZ.
KARL KÖBERLE.